3,171,826
EPOXY-AMINE COATINGS CONTAINING
1-(PHENETHYL) AZIRIDINE
Walter R. Pepis, Briarwood, and Henry B. Yuska, Kew Gardens, N.Y., assignors to Interchemical Corporation, New York, N.Y., a corporation of Ohio
No Drawing. Filed Aug. 30, 1960, Ser. No. 52,775
11 Claims. (Cl. 260—32.8)

This invention relates to epoxy-amine coatings of improved resistance and to methods of making them. More particularly it relates to improvement of epoxy-amine coatings by the incorporation therein of imine compounds.

For some time there has been a commercial demand for aircraft protective coatings with (1) excellent adhesion to aluminum, (2) good flexibility, (3) water-resistance, and (4) resistance to hydraulic fluids of the phosphate ester type.

Of the various systems tested it was found that epoxy-amines had the best overall properties, but under the required curing cycles their resistance to water was inadequate. The present invention is based on the discovery that the combination of imines with epoxy-amines notably improves the water resistance of the coatings without degrading their desirable properties. Of the various imines tested, the best was found to be 1-(phenethyl) aziridine. Others that clearly improved the water-resistance of epoxy-amines were tris-(1-aziridinyl) phosphine oxide, diethylene hexamethylene diurea, and triethylene melamine.

In the examples that follow, parts are parts by weight and the various ingredients are further defined in this list:

Epon 1001 is a designation for a bisphenol-epichlorohydrin resin with an epoxy equivalent of 425–550 and a melting point of 64 to 76° C.

Epon 828 is also a bisphenol-epichlorohydrin resin. It has an epoxy equivalent of 180–195, a melting point of 8 to 16° C., and an average molecular weight of about 390.

C-111 is a curing agent for, among other resins, Epons 1001 and 828. C-111 is a precondensed epoxy-amine adduct equivalent to the condensation product of 35% by weight of Epon 1001 and 12.6% by weight of diethylene triamine in solution in a mixed solvent consisting essentially of equal parts by weight of xylene, methyl isobutyl ketone, and Cellosolve.

Beetle 216–8 is a urea-formaldehyde resin solution. It is supplied as a solution containing 60 parts of the resin, 30 parts of butanol, and 10 parts xylol and has a Gardner-Holdt viscosity of S–V. The solids have an acid number of 0.5 and 2.0.

The solvents were of commercial grade. The titanium dioxide was R–610 rutile type.

Example 1

Pebble milled to satisfactory dispersion were (A)

|  | Parts |
|---|---|
| Epon 1001 | 250.75 |
| Beetle 216–8 | 12.50 |
| Titanium dioxide | 159.00 |
| Magnesium silicate | 180.00 |
| Carbon pigment (Superba) | 0.75 |
| Methyl isobutyl ketone | 358.50 |
| Butanol | 90.00 |
| Toluol | 90.00 |
| Xylol | 358.50 |

180.0 parts of this combination were combined with 12.00 parts of 1-(phenethyl) aziridine and 90.0 parts of the following combination.

(B)

|  | Parts |
|---|---|
| Shell's C-111 | 225.00 |
| Beetle 216–8 | 22.50 |
| Xylol | 251.25 |
| Butanol | 251.25 |

The ingredients were pebble-milled to satisfactory dispersion.

Example 2

A clear coating was made by following the formulations and procedures of Example 1 with the following exceptions. Instead of 250.75 parts of Epon 1001, 250.75 parts of Epon 828 were used. The pigments were omitted, that is, the magnesium silicate, the titanium dioxide, and the carbon black.

Example 3

This is the same as Example 1, but with all Beetle 216–8 omitted. The resistant properties were similar to Example 1.

Example 4

This is the same as Example 2 but with all Beetle 216–8 omitted. The resistant properties were similar to Example 1.

Example 5

The ingredients of Example 1 can be formulated into a suitable coating without first precondensing the epoxy resins and the amine. The following example illustrates this technique.

|  | Parts |
|---|---|
| Dispersion (A) of Example 1 | 180 |
| 1-(phenethyl aziridine) | 12 |
| Solution (B), consisting of 22.5 parts Beetle 216–8, 251.25 parts xylol, 251.25 parts butanol | 90 |
| Ethylene diamine | 18 |

The function of the Beetle 216–8 (urea formaldehyde) resin in Examples 1 and 2 is to improve the flow properties and thus make more uniform coatings with the compositions described. This is a conventional procedure.

In combination A of the examples methyl isobutyl ketone may be varied from about 340 to about 370 parts, butanol 75 to 100, toluol 75 to 100, and xylol 340 to 370. The ratios of the solvents, however, must be retained in the relationships of butanol 1/toluol 1/methyl isobutyl ketone 4/xylol 4.

The coating compositions of the examples, when applied on aluminum directly or over a wash primer and cured at least one day by air drying had water and humidity resistance. Without the imines the coatings failed in both these tests. As a single coat system applied directly on unprimed aluminum, cured 2 hours at 150° F. and then air dried for at least one day, the compositions containing the imines showed water and humidity resistance decidedly better than the coatings without imines.

The water resistance test was performed by immersing a coated panel in water for 24 hours, removing, and wiping dry. With a razor blade, two parallel scratches cutting down to the metal were made, two inches long and one inch apart. Masking tape was then laid on at right angles to the scratches and pressed down for a distance of one inch beyond each scratch, so that approximately 3 inches of tape adhered firmly to the coating. The tape was then yanked off and the area examined for damage to the coating.

The hydraulic fluid resistance test was carried out by making two straight scratches through the coating down to the metal and diagonally from corner to corner of the panel, forming an X. Each day a commercial phosphate ester type hydraulic fluid was sprinkled on the surface. 24 hours later the panels were wiped dry and examined for damage. The process was repeated until failure of the coating was detected.

Tests were made on (1) the composition described in Example 1 and (2) the same without the imine and (3) a commercial coating composition competing in the same field. Coatings were prepared on unprimed aluminum, cured 2 hours at 150° F., and air-dried one day. (2) and (3) failed, (1) showed good resistance in the water test. All three resisted hydraulic fluid for a while, but failed after one week. All showed the same (good) resistance to cleaning solutions. In the weatherometer (accelerated weathering tester) (1) yellowed after 300 hours, and (2) and (3) after 500 hours.

What is claimed is

1. The method of improving the water resistance of amine-cured epoxy resin films which consists in incorporating 1-(phenethyl) aziridine into an epoxy resin-amine coating composition, wherein the epoxy resins comprise bisphenol-epichlorohydrin resins, and said amine is selected from the group consisting of diethylene triamine and ethylene diamine, applying the composition to a substrate, and curing the film in conventional manner.

2. The method of claim 1 wherein the epoxy resin comprises a bisphenol-epichlorohydrin resin having an epoxy equivalent of from about 180 to about 550 and the amine curing agent comprises a precondensed epoxy-amine capable of curing the bisphenol-epichlorohydrin resin both being dissolved in a volatile organic solvent.

3. The method of claim 2 wherein the organic solvent comprises a ketone, an alcohol, and aromatic hydrocarbons selected from the group consisting of benzol, toluol and xylol.

4. The method of claim 2 wherein the curing is accomplished by heating the coating for about 2 hours at about 150° F., and then air drying for at least ½ day.

5. The method of claim 4 wherein the volatile organic solvent comprises 1 part by weight of butanol, 1 part toluol, 4 parts xylol, and 4 parts methyl isobutyl ketone.

6. A coating composition comprising epoxy resin, amine curing agent for the epoxy resin selected from the group consisting of diethylene triamine and ethylene diamine, said epoxy resin comprising a bisphenol-epichlorohydrin resin, and 1-(phenethyl) aziridine dissolved in volatile organic solvent.

7. The coating composition described in claim 6 in which the epoxy resin comprises a bisphenol-epichlorohydrin resin having an epoxy equivalent of from about 180 to about 550 and the amine curing agent comprises a precondensed epoxy-amine capable of curing the bisphenol-epichlorohydrin resin.

8. The coating composition described in claim 7 in which the volatile organic solvent comprises a ketone, an alcohol, and aromatic hydrocarbon selected from the group consisting of benzol, toluol, and xylol.

9. The coating composition described in claim 7 containing pigments and fillers and in which the bisphenol-epichlorohydrin resin has an epoxy equivalent of 425–550.

10. The coating composition described in claim 7 in which the bisphenol-epichlorohydrin resin has an epoxy equivalent of 180–195.

11. The coating composition described in claim 7 in which the solvent comprises 1 part by weight of butanol, 1 part toluol, 4 parts xylol, and 4 parts methyl isobutyl ketone.

References Cited in the file of this patent
UNITED STATES PATENTS

| | | |
|---|---|---|
| 2,864,775 | Newey | Dec. 16, 1958 |
| 2,938,880 | Bailey | May 31, 1960 |
| 2,944,051 | Graefe | July 5, 1960 |
| 2,950,197 | Allen et al. | Aug. 23, 1960 |
| 2,958,691 | Smrt et al. | Nov. 1, 1960 |